United States Patent [19]

Penberthy

[11] Patent Number: 4,699,338
[45] Date of Patent: Oct. 13, 1987

[54] STEERABLE PARACHUTE

[75] Inventor: Vivian M. Penberthy, Krugersdorp, South Africa

[73] Assignee: Demlux Securities B.V., Voorburgwal, Netherlands

[21] Appl. No.: 838,281

[22] Filed: Mar. 10, 1986

[30] Foreign Application Priority Data

Mar. 15, 1985 [ZA] South Africa ............... 85/1954

[51] Int. Cl.$^4$ .................. B64D 17/14; B64D 17/18
[52] U.S. Cl. ................................ 244/152; 244/142
[58] Field of Search ................. 244/145, 142, 152

[56] References Cited

U.S. PATENT DOCUMENTS

| 3,117,753 | 1/1964 | Ewing | 244/152 |
| 3,170,661 | 2/1965 | Basnett | 244/152 |
| 3,343,769 | 9/1967 | Basnett | 244/152 |
| 3,458,161 | 7/1969 | Pohl et al. | 244/145 |
| 3,773,284 | 11/1973 | Matsuo et al. | 244/152 |
| 3,829,046 | 8/1974 | Matsuo et al. | 244/152 |
| 4,078,744 | 3/1978 | Heinrich | 244/145 |
| 4,638,961 | 1/1987 | Rousseau | 244/152 |

FOREIGN PATENT DOCUMENTS

| 0160597 | 11/1985 | European Pat. Off. | 244/145 |
| 1343242 | 10/1963 | France | 244/145 |
| 516244 | 2/1955 | Italy | 244/152 |
| 1050971 | 12/1966 | United Kingdom | 244/145 |

Primary Examiner—Joseph F. Peters, Jr.
Assistant Examiner—Lynn M. Fiorito
Attorney, Agent, or Firm—Ladas & Parry

[57] ABSTRACT

The invention relates to a parachute including a steerable canopy. Steerability is achieved by providing a venting gore in the canopy and two or more maneuvering suspension lines secured to the hem of the canopy on opposite sides of the venting gore. The maneuvering suspension lines are arranged to be extendible so that on extension it allows the canopy hem in the region of the gore to lift slightly to provide a forward drive to the canopy in flight. During flight the canopy may be steered by manipulation of the maneuvering lines thereby to change the direction in which air escapes from the canopy. The canopy may also be fitted with an auxiliary suspension system arranged and adapted to reduce opening time of the canopy.

10 Claims, 7 Drawing Figures

STEERABLE PARACHUTE

This invention relates to parachutes and more specifically but not exclusively to tactical assault personnel parachutes intended for use in military operations.

The degree of sophistication of anti-aircraft defence systems has rendered paratrooper delivery aircraft extremely vulnerable and has given rise to the need for a parachute by which individual tactical assault parachutists may safely and reliably be airdropped from an aircraft flying at 130 to 150 knots indicated air speed at a minimum altitude of 100 meters above ground level over a drop zone situated at an elevation of between sea level and about 3000 meters above mean sea level.

It has now been realised that even when used to airdrop parachutists from the very low altitudes referred to above, it is highly desirable for the parachute to be maneuverable thereby to allow the parachutist to steer the parachute during descent to ensure landing in closer proximity of his fellow parachutists than would normally be the case without facility.

A steerable canopy having an inherent continuous forward drive during flight as a result of the unsymmetrical removal of canopy area is known in the trade. As an example of such a design, reference may be had to the American military-parachute generally known as the MCI-IB. The steering mechanism and design of the MCI-IB are however considered to be ineffective to meet the modern requirements referred to above and the additional requirement that the parachute design should allow for the simultaneous exit of paratroopers from opposing exit doors of a carrier aircraft without special controlled exit procedures and with a small probability of mid-air collision of parachutists during the period between exit and the time when the parachutist is able to establish control of his canopy. This view stems mainly from the fact that the forward drive on which the steerability of that canopy depends is continuously presently both during and after inflation of the canopy when ideally the canopy should display a zero drive during inflation and a positive forward drive after inflation.

It is an object of the present invention to provide a parachute with low or no forward drive during inflation and capable after inflation of being converted to a steerable parachute having a controllable forward drive. A further object of the present invention is to provide a parachute having the drive and steerability features set out above and which in addition also optionally includes a rapid deployment modification for ensuring the rapid deployment of the parachute.

According to the present invention a parachute comprises a dome shaped canopy defining an apex and a peripheral hem, the canopy being constituted by a plurality of generally isosceles triangular gores joined to adjacent gores along main seams to define a canopy of circular plan form, the gores being constituted by a plurality of panels joined together along cross seams and a main suspension system comprising a plurality of primary suspension lines of substantially equal length and at least two maneuvering suspension lines of greater length than the primary suspension lines and disposed adjacent one another, each of the suspension lines of the main suspension system being secured at a first end thereof to the hem of the canopy, the opposite ends of the primary suspension lines being connected to one of a set of primary anchor formations each disposed at or near an end of one of a set of risers, the opposite end of each riser being adapted in use to be connected to a parachute harness, and the opposite or second ends of the maneuvering suspension lines being operatively associated with a secondary anchor formation located on a riser intermediate the ends thereof, the arrangement being such that the maneuvering suspension lines may be releasably anchored at a point spaced inwardly of its second end to the secondary anchor in a first anchored condition such that the distance between the hem of the canopy and the harness engaging end of the risers is substantially constant when measured along the path defined by any of the suspension lines via its anchor point on the riser to the harness engaging end of the riser, and that the maneuvering suspension lines may optionally be released from such first anchored condition to be held in a second anchored condition in which the distance between the hem and the harness engaging end of the risers is greater when measured as aforesaid along the maneuvering suspension lines than when measured along the primery suspension lines, the arrangement being further characterized in that the canopy is provided with two or more venting gore segments of higher air permeability than the remaining gore segments and spaced symmetrically about the axis of the canopy passing through the apex thereof, and in that the maneuvering suspension lines are secured to the hem in the proximity of the main seams flanking a gore provided with a venting segment.

In one form of the invention the parachute may further include an auxiliary suspension system extending between the risers and the interior of the canopy, said auxiliary suspension system comprising upper and lower line arrangements each of which is disposed adjacent a line substantially on the axis of the canopy while the canopy is in streamer configuration and load transfer means radially disposed within said canopy and having opposed ends, one of said ends being secured to said upper and lower line arrangements and the other end of said load transfer means being secured to the interior of said canopy, the arrangement of the main suspension system and auxiliary suspension system being such that, in use, the opposing forces of drag acting on the canopy and gravity acting on a load secured to the risers are substantially taken up by the auxiliary suspension system leaving the main suspension system essentially untensioned while the canopy is in streamer configuration and by the main suspension system when the canopy is fully deployed.

In a preferred form of the invention the load transfer means comprises a plurality of internal radial lines joined at first ends thereof to the interior of the canopy surface at a position intermediate the hem and the apex thereof and joined together at their opposite ends in a confluence, said upper line arrangement comprising an upper axial line extending between the confluence and the apex of the canopy and said lower line arrangement extending between the risers and the confluence. Preferably the internal radial lines are joined to the canopy at fastening points constituted by points of intersection between main seams and cross-seams.

The gores constituting the canopy preferably comprise a plurality of panels of isosceles trapezium or trapezoid shape joined along cross-seams and preferably the gores each contain four panels. The gores may be manufactured from any suitable fabric and the venting segments in the gores may be constituted by gore panels manufactured from net fabric.

The venting gores may have the two panels nearest the hem of the canopy replaced by net fabric.

The canopy preferably includes three gores having venting segments, such venting gores being spaced at 120° intervals about the axis of the canopy.

Preferably one of the venting gores constitute the rearmost gore in the canopy.

In a preferred form of the invention the parachute includes four maneuvering suspension lines which are disposed adjacent to one another, the innermost two maneuvering suspension lines being secured at first ends thereof respectively to the intersections of the hem and the two main seams flanking the venting gore constituting the rearmost gore of the canopy and the two outer maneuvering suspension lines being secured respectively to intersections of the adjacent main seams with the hem, and each outer maneuvering suspension line is joined towards the opposite end thereof to the maneuvering suspension line adjacent thereto and to an extension of the joined lines, the extension defining a handle grip at or towards its free end and a receiving formation intermediate its free end and the joint, such receiving formation being adapted for use to releasably anchor the maneuvering suspension line pair to the secondary anchor on the riser. In one form of the invention the receiving formation may comprise a split zone in the extension, the handle grip may present a retaining pin formation and the secondary anchor formation may be in the form of a ring formation secured to the riser, and in use the extension may pass through the ring to have the split zone disposed on the side of the ring remote from the canopy and held in place by locating the retaining pin formation through the split zone.

When the maneuvering suspension lines are anchored, as described above, the effective lengths of the suspension lines are such that the parachute would present a symmetric planform during flight and in view of the symmetric location of the venting gores would have no inherent continuous forward drive. If required, the effective lengths of maneuvering suspension lines may be extended by withdrawing the retaining pin formation from the split zone of the extension thereby allowing the extension to slip through the anchor ring until the grip comes into contact with the anchor ring. Such extension of the maneuvering suspension lines would cause the rearmost venting gore to billow out and to lift the hem section associated with the venting gore and the adjacent gores slightly relative to the plane which the hem defines during symmetric flight. Accordingly such release causes the canopy to convert from a symmetric flight planform to an asymmetric flight planform resulting in the parachute thereby acquiring an inherent continuous forward drive.

Manipulation of the maneuvering suspension lines may then be effected to cause the parachute to turn by controlling the direction in which air is allowed to escape from the raised section of the hem and the venting gore associated therewith as is described in greater detail below.

A preferred form of the invention will now be described with reference to the accompanying drawings in which.

Figure 1:
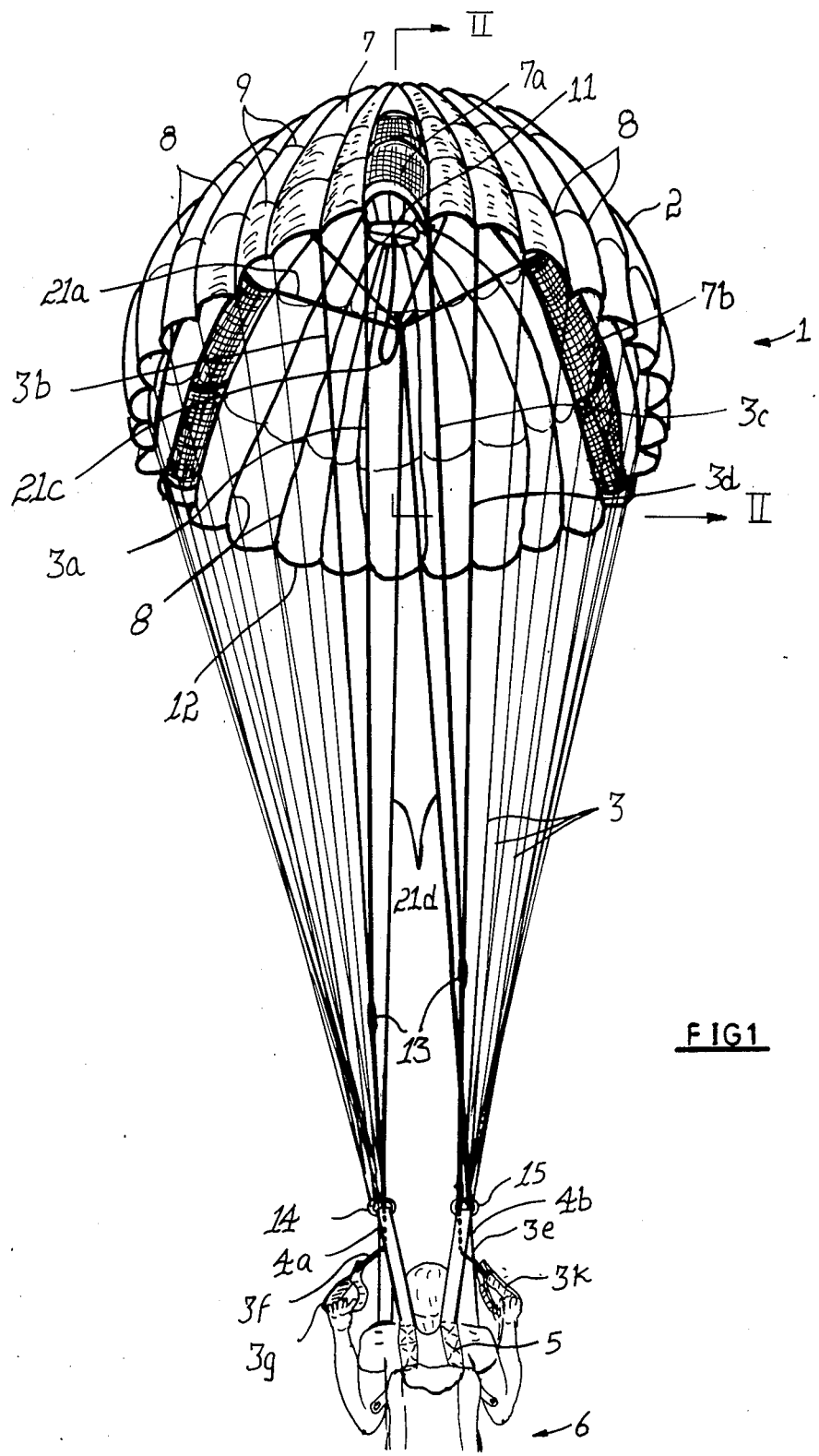
FIG. 1 is a perspective view from the rear of a parachutist descending with a parachute according to the invention.

Referring now to the accompanying drawings in which the same reference numerals are used to indicate corresponding parts a parachute 1 is shown to comprise a canopy 2, a plurality of suspension lines 3, and a set of risers 4a, 4b connected to the harness 5 of a parachutist 6.

The canopy comprises thirty generally triangular shaped gores 7 which are joined one to the other along main seams 8. Each gore comprises four panels [not specifically indicated] which panels are joined together along cross-seams 9. The canopy further defines an apex 11 and a hem 12 to which the suspension lines 3 are secured at positions at which the main seams 8 intersect with the hem 12.

Three symmetrically spaced gores, indicated at 7a, 7b and 7c, are provided with venting segments constituted by net fabric panels replacing the conventional canopy fabric to define three areas of higher air permeability in the canopy. It will be noticed that the vent segments are symmetrically spaced at 120° intervals about the axis of the canopy and that one of the venting gores constitutes the rearmost gore relative to the normal forward flight direction of the parachute.

Four of the suspension lines 3 constitute maneuvering suspension lines and these are indicated as 3a, 3b, 3c and 3d. It will be seen that the maneuvering suspension lines 3a and 3c flank the rearmost gore indicated at 7a and that maneuvering suspension lines 3b and 3d are located immediately adjacent the suspension lines 3a and 3c. The suspension lines 3a and 3b are joined together towards their ends remote from the hem of the canopy and maneuvering suspension lines 3c and 3d are likewise joined together as shown at 13. The remaining suspension lines 3 are connected to brackets 14 and 15 forming part of the risers 4a and 4b.

Figure 3:
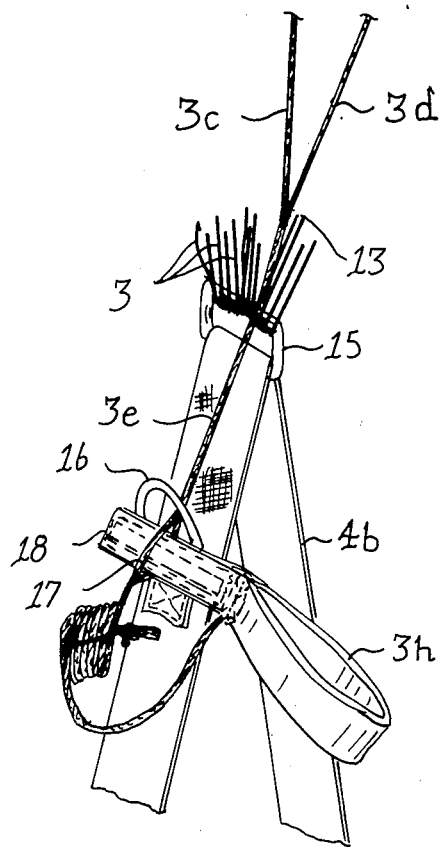
FIG. 3 is a detailed perspective view of the handle end of the maneuvering suspension line and the riser to which it is anchored in use.
Figure 4A:
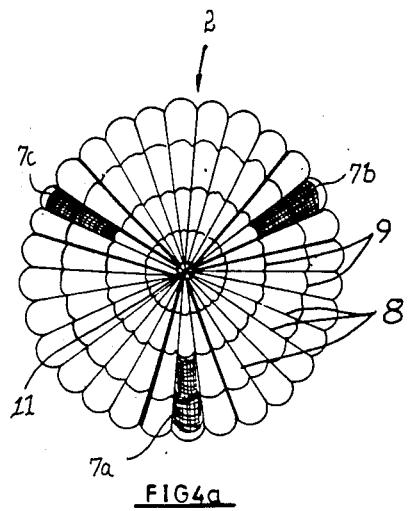
FIGS. 4a–4d are plan views of a parachute, as shown in FIG. 1, to illustrate the maneuvres which may be executed with the parachute.
Figure 4B:
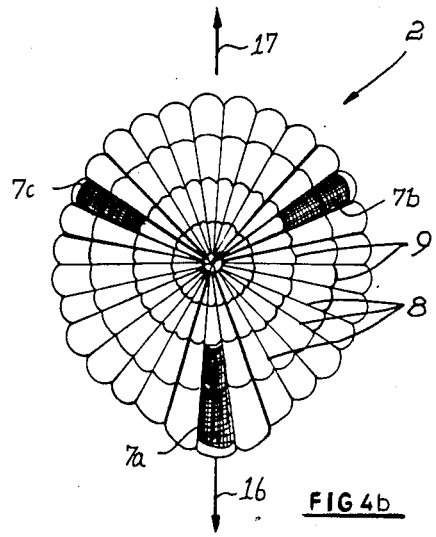
Figure 4C:
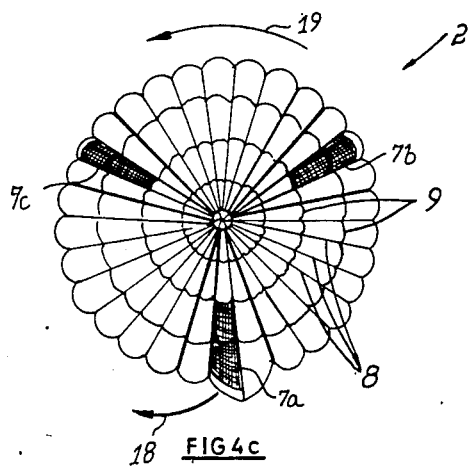
Figure 4D:
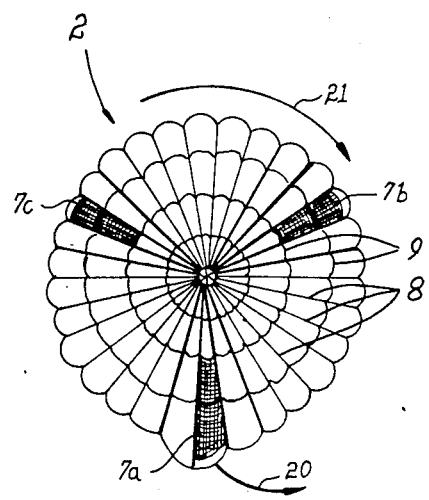

An extension of the lines 3c and 3d is provided below their confluence is indicated at 3e and the extension of maneuvering suspension lines 3a and 3b is indicated at 3f. The extensions 3e and 3f are respectively provided with grip handles 3g and 3h. In use the extensions 3e pass through an anchor ring 16 which is mounted on the risers 4a and 4b. The extensions 3e are also provided with an eye formation or split zone 17 through which a pin member 18 forming part of the grip handles may pass to retain a length of the extension 3e, 3f on one side of the rings 16. The positions of the eye formation in the extensios 3e and 3f respectively are selected such that when the extension is retained as illustrated in FIG. 3, the effective length of all the lines 3a, 3b, 3c and 3d between the hem 12 of the canopy and the load is constant so that the parachute would in flight have a substantially symmetrical planform as shown in FIG. 4a while the extensions are retained as shown in FIG. 3. However, withdrawal of the pin formation 18 from the eye formation 17 in the extensions 3e and 3f would allow the stowed section of the extensions 3e and 3f to be drawn through the ring 16 to bring the grip handle into contact with the ring 16 thus allowing the skirt of the canopy in the area about the gore 7a to billow or extend and to lift slightly relative to the plane in which the remaining part of the hem is located as can best be seen in FIG. 2 and 4b. In this condition air entrapped by the canopy would be caused to spill below the hem of gore 7a and its flanking gores thus causing a forward drive to be effected to the parachute. This phenomenon is illustrated in FIG. 4b showing the non-symmetrical planform of the parachute when the gore 7a and its flanking gores are extended allowing air to escape from below the canopy in unsymmetrical fashion in the direction indicated by arrow 16 thus causing the parachute to glide forward in the direction of arrow 17. The parachutist would now have the facility of steering the parachute. For example, pulling down on the handle 3g he would cause air to escape from the venting gore 7a in the direction indicated by arrow 18 in FIG. 4c thus causing the parachute to turn in the direction indicated by the arrow 19 in FIG. 4c and by pulling down on the handle 3h, he would cause the venting gore 7a to assume the orientation indicated in FIG. 4d thus causing air to spill from below the canopy and to escape through gore 7a in the direction indicated by arrow 20 and resulting in a turning of the canopy in the direction indicated by the arrow 21 in FIG. 4d.

The parachute further includes an auxiliary suspension system generally indicated by reference numeral 21 which is arranged to have the effect of reducing the opening time of the canopy.

Such reduced opening time of the canopy is achieved as a result of the fact that during streamer configuration of the parachute immediately after exit from an aircraft, the axial line system 21 takes up the opposing forces of drag on the canopy and gravity acting on the load as a result of the radial lines 21a being connected to positions on the canopy remote from the hem. This ensures that the skirt spreading forces are virtually unopposed and consequently the opening speed of the canopy is increased.

Figure 2:
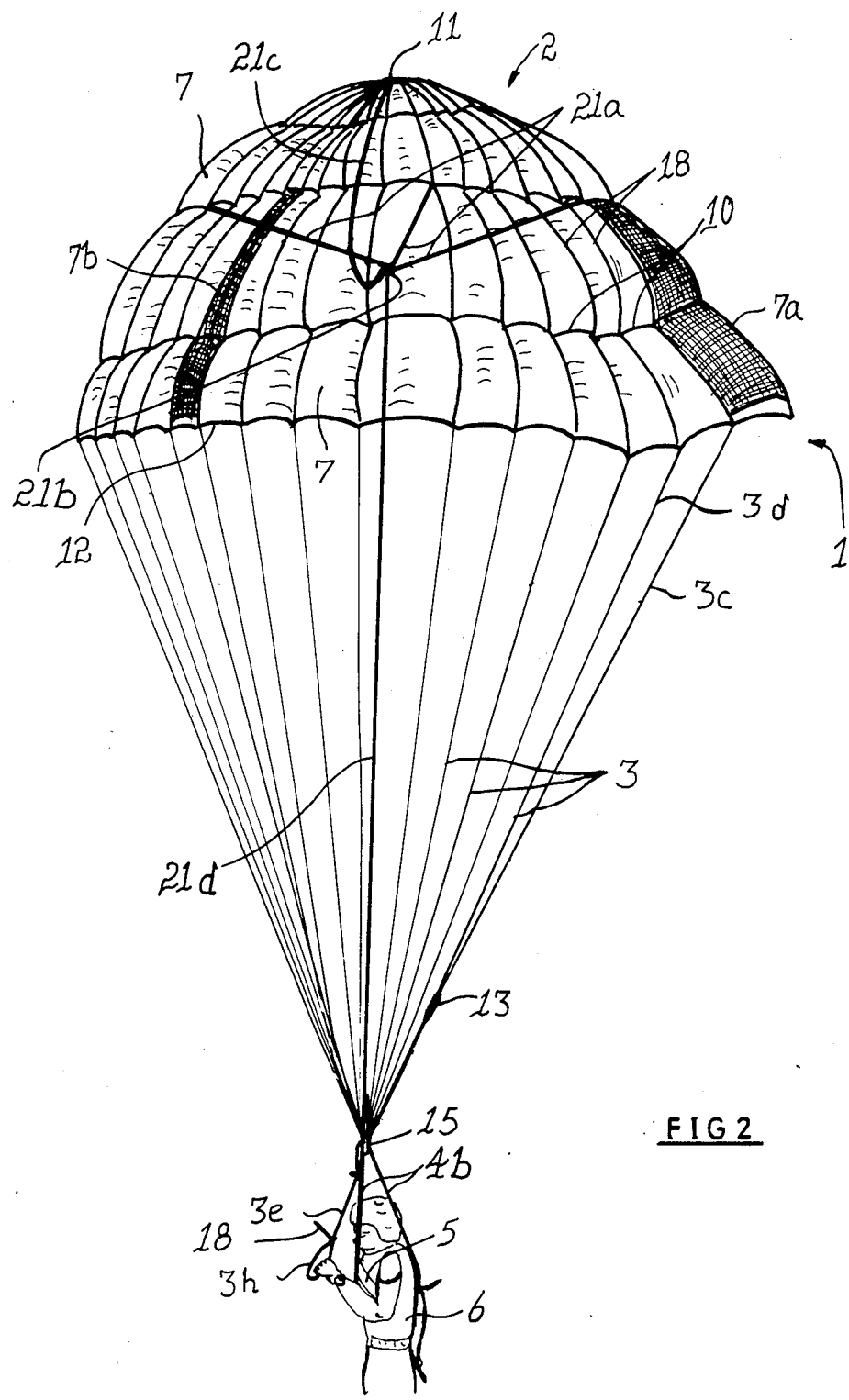
FIG. 2 is a section on line II—II through the parachute of FIG. 1.

The auxiliary suspension system is best illustrated in FIGS. 1 and 2. The system comprises eight internal radial lines 21 [of which only some are shown] which are secured at first ends thereof to fastening points falling on intersections of main seams 8 and cross seams 9 of the canopy and which are connected together at their opposite ends in a confluence 21b. An upper axial line 21c extends between the confluence 21b and the vent opening provided at the apex 11 of the canopy. The system further includes two lower axial lines 21d which respectively extend between the confluence 21b and the brackets 14 and 15 forming part of the risers 14 and 15.

While the parachute is in streamer configuration during deployment the opposing forces of drag and gravity are initially taken up by the lower axial lines 21d and upper axial line 21b. As skirt spreading sets in the opposing forces are transferred to the internal radial lines 21c and the lower axial lines 21d. Throughout these stages the main suspension lines remain substantially untensioned so that the hem section of the canopy is allowed to spread substantially unopposed. Once the skirt is fully spread the main suspension lines 3 assume the opposing forces while the lines 21a and 21d remain just sufficiently taught not to interfere with the parachutist but without acting as suspension lines to the same extent as the main suspension lines [including 3a to 3d].

It will be seen that by the arrangement of the invention the symmetrically spaced vent openings 7a, 7b and 7c would cause symmetrical escape of air through the vent openings during the inflation period of the parachute but that after inflation of the parachute, the extension of suspension lines 3a, 3b, 3c and 3d would cause a non-symmetrical escape of the air and hence provide the facility of allowing forward drive and steerability of the canopy as described above.

Clearly many variations in the detail of the invention may be thought of without thereby departing from the spirit of the invention.

The flying profile of the canopy may also take many different forms and may, for example, be conical, semicircular, parabolic or any other suitable shape.

I claim:

1. A parachute comprising a dome shaped canopy defining an apex and a peripheral hem, the canopy being constituted by a plurality of generally isosceles triangular gores joined to adjacent gores along main seams to define a canopy of circular plan form, the gores being constituted by a plurality of panels joined together along cross seams, the parachute being characterized by the peripheral hem being uninterrupted along its length; a main suspension system comprising a plurality of primary suspension lines of substantially equal length and at least two maneuvering suspension lines of greater length than the primary suspension lines and disposed adjacent one another, each of the suspension lines of the main suspension system being secured at a first end thereof to the hem of the canopy, the opposed ends of the primary suspension lines being connected to one of a set of primary anchor formations each disposed at or near an end of one of a set of risers, the opposite end of each riser being adapted in use to be connected to a parachute harness, and the opposite or second ends of the maneuvering suspension lines being operatively associated with a secondary anchor formation located on a riser intermediate the ends thereof, the arrangement being such that the maneuvering suspension lines may be releasably anchored at a point spaced inwardly of its second end to the secondary anchor in a first anchored condition such that the distance between the hem of the canopy and the harness engaging end of the risers is substantially constant when measured along the path defined by any of the suspension lines via its anchor point on the riser to the harness engaging end of the riser, and that the maneuvering suspension lines may optionally be released from such first anchored condition to be held in a second anchored condition in which the distance between the hem and the harness engaging end of the risers is greater when measured as aforesaid along the maneuvering suspension lines than when measured along the primary suspension lines, and by such release causing the hem segment to which the maneuvering suspension lines are secured to lift relative to the plane of the remainder of the hem and the associated gores to billow outwardly relative to the dome profile of the canopy thereby to channel air entrapped by the canopy to be emitted in a directionally controllable manner from below the lifted segment of the canopy hem, the arrangement being further characterized in that the canopy is provided with two or more venting gore segments of higher air permeability than the remaining gore segments and spaced symmetrically about the axis of the canopy passing through the apex thereof, and in that the maneuvering suspension lines are secured to the hem in the proximity of the main seams flanking a gore provided with a venting segment to be disposed on opposite sides of the gore provided with a venting segment.

2. The parachute of claim 1 which includes an auxiliary suspension system extending between the risers and the interior of the canopy, said auxiliary suspension system comprising upper and lower line arrangements each of which is disposed adjacent a line substantially on the axis of the canopy while the canopy is in streamer configuration and load transfer means radially disposed within said canopy and having opposed ends, one of said ends being secured to said upper and lower line arrangements and the other end of said load transfer means being secured to the interior of said canopy, the arrangement of the main suspension system and auxiliary suspension system being such that, in use, the opposing forces of drag acting on the canopy and gravity acting on a load secured to the risers are substantially taken up by the auxiliary suspension system leaving the main suspension system essentially untensioned while the canopy is in streamer configuration and by the main suspension system when the canopy is fully deployed.

3. The parachute of claim 2 in which the load transfer means comprises a plurality of internal radial lines joined at first ends thereof to the interior of the canopy surface at a position intermediate the hem and the apex thereof and joined together at their opposite ends in a confluence, said upper line arrangement comprising an upper axial line extending between the confluence and the apex of the canopy and said lower line arrangement extending between the risers and the confluence.

4. The parachute of claim 3 wherein the internal radial lines are joined to the canopy at fastening points constituted by points of intersection between main seams and cross-seams.

5. The parachute of claim 1 in which the gores constituting the canopy comprises four panels of isosceles trapezium or trapezoid shape joined along cross-seams.

6. The parachute of claim 5 in which the venting gores are made up of two panels of conventional canopy fabric and in which the two panels nearest the hem of the canopy are venting segments and of a net fabric.

7. The parachute of claim 6 which includes three gores having venting segments, such venting gores being spaced at 120° intervals about the axis of the canopy.

8. The parachute of claim 7 in which one of the venting gores constitute the rearmost gore in the canopy.

9. The parachute of claim 8 which includes four maneuvering suspension lines which are disposed adjacent to one another, the innermost two maneuvering suspension lines being secured at first ends thereof respectively to the intersections of the hem and the two main seams flanking the venting gore constituting the rearmost gore of the canopy and the two outer maneuvering suspension lines being secured respectively to intersections of the adjacent main seams with the hem, and each outer maneuvering suspension line is joined towards the opposite end thereof to the maneuvering suspension line adjacent thereto and to an extension of the joined lines, the extension defining a handle grip at or towards its free end and a receiving formation intermediate its free end and the joint, such receiving formation being adapted for use to releasably anchor the maneuvering suspension line pair to the secondary anchor on the riser.

10. The parachute of claim 9 in which the receiving formation comprises a split zone in the extension, the handle grip presents a retaining pin formation and the secondary anchor formation is in the form of a ring formation secured to the riser, the arrangement being such that in use the extension may pass through the ring to have the split zone disposed on the side of the ring remote from the canopy and held in place by locating the retaining pin formation through the split zone.

* * * * *